United States Patent [19]
De Wald et al.

[11] 3,873,565
[45] Mar. 25, 1975

[54] PYRAZOLODIAZOCINE COMPOUNDS
[75] Inventors: Horace A. De Wald, Ann Arbor; Yvon J. L'Italien, Plymouth, both of Mich.
[73] Assignee: Parke, Davis & Company, Detroit, Mich.
[22] Filed: May 16, 1973
[21] Appl. No.: 360,622

[52] U.S. Cl. ...... 260/310 R, 260/295 K, 260/296 B, 260/296 R, 260/583 P, 424/263, 424/273
[51] Int. Cl. ............................................. C07d 57/02
[58] Field of Search ......... 260/310 R, 296 B, 295 K

[56] References Cited
UNITED STATES PATENTS

| | | | |
|---|---|---|---|
| 3,553,209 | 1/1971 | L'Italien et al. | 260/310 R |
| 3,553,210 | 1/1971 | Nordin | 260/310 R |
| 3,558,605 | 1/1971 | De Wald et al. | 260/310 R |
| 3,657,271 | 4/1972 | Swett | 260/310 R |
| 3,770,762 | 11/1973 | Butler | 260/310 R |

*Primary Examiner*—Natalie Trousof

[57] ABSTRACT
6,7,8,9-Tetrahydropyrazolo[3,4-b][1,5]diazocine compounds (I; $R_1$ is methyl or ethyl, $R_2$ is methyl, ethyl or nitro, $R_3$ is hydrogen, methyl, ethyl, nitro, trifluoroacetyl, dialkylaminoalkyl or 1-pyrrolidinylethyl, $R_4$ and $R_5$ are hydrogen or lower alkyl, $R_6$ is hydrogen or methyl, Z is N or N → O, and Ar is phenyl, substituted phenyl, cyclohexyl, 2-thienyl or 2-pyridyl) are provided by several methods: (a) reacting a 4-(aroyl)-5-chloropyrazole with a 1,3-alkanediamine, (b) alkylating, (c) nitrating, or (d) trifluoroacetylating a pyrazolodiazocine at the $N^9$-position, (e) forming the $N^5$-oxide of a pyrazolodiazocine, and (f) hydrolyzing a 9-trifluoroacetylpyrazolodiazocine. The compounds are useful as intermediates and as antidepressant agents.

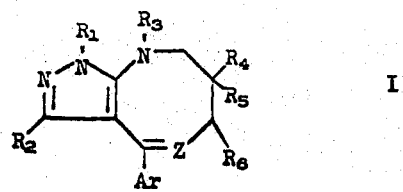

9 Claims, No Drawings

PYRAZOLODIAZOCINE COMPOUNDS

SUMMARY AND DETAILED DESCRIPTION:

The present invention relates to new heterocyclic nitrogen compounds that are useful as pharmacological agents and to methods for their production. More particularly, the invention relates to new pyrazolodiazocine compounds having the formula

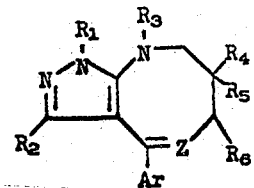

I and to pharmaceutically-acceptable salts thereof; where $R_1$ is methyl or ethyl, $R_2$ is nitro, methyl or ethyl, $R_3$ represents hydrogen, methyl, ethyl, nitro, trifluoroacetyl or $—(CH_2)_nNR_7R_8$, $R_4$ and $R_5$ are hydrogen or lower alkyl, $R_6$ is hydrogen or methyl, Z is N or N → O, Ar represents phenyl, halophenyl, tolyl, methoxyphenyl, $\alpha,\alpha,\alpha$-trifluorotolyl, 3,4-dichlorophenyl, cyclohexyl, 2-thienyl or 2-pyridyl, $n$ is 2 or 3, and $—NR_7R_8$ represents dimethylamino, diethylamino or 1-pyrrolidinyl, Z representing N when $R_3$ represents $—(CH_2)_nNR_7R_8$.

In accordance with the invention, pyrazolodiazocine compounds having the formula

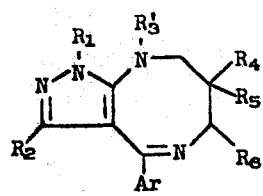

II and salts thereof are produced by reacting a pyrazole compound having the formula

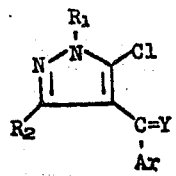

III with a diamine compound having the formula

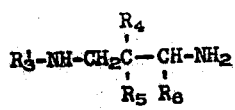

IV where each of $R_1$, $R_2$, $R_4$, $R_5$, $R_6$ and Ar has the same meaning as given above; $R_3'$ represents hydrogen, methyl or ethyl; and Y represents a doubly-bonded oxygen atom (=O) or an imino group (=NH). The reaction is best carried out in a solvent medium, which is preferably an excess of the diamine reactant. Other solvents and solvent mixtures that may be used include tertiary amides, such as 1-methyl-2-pyrrolidinone (which is preferred), dimethylformamide, N,N-dimethylacetamide and hexamethylphosphoramide (which is also preferred); aromatic hydrocarbons, such as toluene and xylene; and glycols, such as ethylene glycol and propylene glycol. The temperature and duration of the reaction may be varied over a wide range, the temperature from about 80° to about 200° C., and the duration from two to 36 hours. The reaction is most conveniently carried out at the reflux temperature of the reaction mixture (135° to 175° C.), and at such temperature is essentially complete after a period of from 6 to 20 hours. While equivalent quantities of the reactants may be employed, best results are obtained by using an excess of the diamine reactant.

Also in accordance with the invention, pyrazolodiazocine compounds having the formula

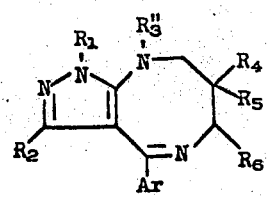

V are produced by reacting a pyrazolodiazocine having formula I where $R_3$ is hydrogen and Z is N with an alkylating agent $R_3'' — A$, where each of $R_1$, $R_2$, $R_4$, $R_5$, $R_6$ and Ar have the same meaning as given above, $R_3''$ represents methyl, ethyl or the group $—(CH_2)_nNR_7R_8$ where $n$ is 2 or 3 and $NR_7R_8$ represents a dimethylamino, diethylamino or 1-pyrrolidinyl group, and A is one equivalent of halide, sulfate or hydrocarbon sulfonate. The reaction is carried out in an unreactive solvent in the presence of a base. Suitable solvents and mixtures of solvents include tertiary amides such as dimethylformamide (which is preferred) and N-methyl-2-pyrrolidinone; ethers such as diethyl ether, tetrahydrofuran and dioxane; hydrocarbons such as benzene and toluene; and dimethyl sulfoxide. Suitable bases include alkali metal hydrides such as sodium hydride (which is preferred) and lithium hydride; alkali metal amides such as sodamide and potassium amide; and alkali metal alkoxides such as sodium methoxide and sodium ethoxide. The temperature and duration of the reaction may be varied widely, the temperature ranging from about 0° to 100° C. and the duration from one to 48 hours. The reaction is more conveniently carried out at temperatures ranging from 20° to 55° C. and at such temperatures is essentially complete within 12 to 20 hours. While equivalent quantities of the reactants and base may be used, best results are obtained by using a 10 to 25 percent excess of base and a 25 to 55 percent excess of alkylating agent.

Further in accordance with the invention, pyrazolodiazocine compounds having the formula

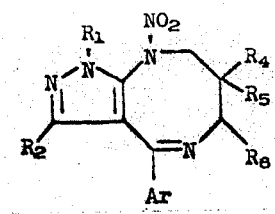

VI are produced by nitrating a pyrazolodiazocine having formula I where $R_3$ is hydrogen and Z is N, in an acidic solvent, preferably accomplished by reaction with potassium nitrate and sulfuric acid, where $R_1$, $R_2$, $R_4$, $R_5$, $R_6$ and Ar have the same meaning as given above. The reaction is carried out at temperatures between 0° to 50° C. for periods ranging from ½ to 10 hours (preferably between 5° to 25° C. for 2 to 4 hours). Approximately equimolar quantities of reactants are preferred. Solvents and mixtures of solvents for the reaction include lower alkanoic acids such as acetic acid and propionic acid; and sulfuric acid, the latter acid and acetic acid in admixture being a preferred solvent.

Still further according to the invention, pyrazolodiazocine compounds having the formula

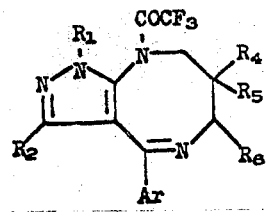

VII are produced by reacting a pyrazolodiazocine having formula I where $R_3$ is hydrogen and Z is N, with trifluoroacetic anhydride in an unreactive solvent, where $R_1$, $R_2$, $R_4$, $R_5$, $R_6$ and Ar have the same meaning as given above. The temperature and duration of the reaction may be varied over a wide range, the temperature from about 0° to about 100° C. and the duration from about 2 to 24 hours. Best results are obtained at temperatures ranging from 15° to 30° C. at which the reaction is usually complete within 12 to 20 hours. Suitable solvents and mixtures of solvents include hydrocarbons such as benzene and toluene; chlorinated hydrocarbons such as dichloromethane, chloroform and 1,2-dichloroethane (which is preferred); ethers such as diethyl ethyl, dioxane and tetrahydrofuran; and acids such as acetic acid and trifluoroacetic acid. While equivalent quantities of the reactants may be employed, best results are obtained by using an excess of trifluoroacetic anhydride.

According to another embodiment of the invention, pyrazolodiazocine compounds having the formula

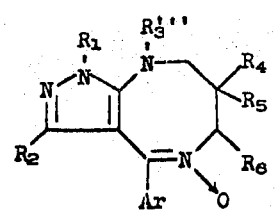

VIII are produced by reacting a pyrazolodiazocine having formula I with an oxidizing agent in an unreactive solvent, where each of $R_1$, $R_2$, $R_4$, $R_5$, $R_6$ and Ar have the same meaning as given above, $R_3$ and $R_3''$ each represent hydrogen, methyl, etheyl, nitro or trifluoroacetyl and Z is N. A suitable oxidizing agent may be any of a number of organic peracids including performic, peracetic, perbenzoic, monoperphthalic, trifluoroperacetic, p-nitroperbenzoic, and m-chloroperbenzoic acids, the latter being preferred. Suitable solvents and mixtures of solvents include chlorinated hydrocarbons such as dichloromethane, chloroform (which is preferred) and tetrachloroethane; hydrocarbons such as benzene and toluene; lower alkanoic acids such as acetic and propionic acids; tertiary amides such as dimethylformamide and N-methyl-2-pyrrolidinone. The reaction can be carried out at temperatures between 0° to 50° C. for periods ranging from ½ to 10 hours (preferably between 5° to 25° C. for 2 to 4 hours). Approximately equimolar amounts of the reactants, up to a 15 percent excess of oxidizing agent, are preferred.

According to still another embodiment, pyrazolodiazocine compounds having the formula

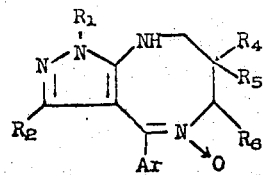

IX are produced by hydrolyzing a pyrazolodiazocine having formula I in an aqueous solvent in the presence of a catalyst, where each of $R_1$, $R_2$, $R_4$, $R_5$, $R_6$ and Ar have the same meaning as given above, $R_3$ is a trifluoroacetyl group and Z is N → O. Either an acidic catalyst or a basic catalyst may be used (the latter being preferred) including sodium hydroxide, potassium hydroxide, ammonia (aqueous ammonia is a preferred catalyst), sodium carbonate and potassium carbonate. Suitable solvents and mixtures of solvents include aqueous lower alkanols such as methanol (which is preferred) and ethanol; aqueous tertiary amides such as dimethylformamide and N-methyl-2-pyrrolidinone; and aqueous water-miscible ethers such as tetrahydrofuran and dioxane. The temperature and duration of the reaction may be varied widely, the temperature ranging from about 0° to 100° C. and the duration from 1 to 48 hours, preferably at 15° to 30° C. for 12 to 20 hours.

The various pyrazolodiazocine products of the reactions described above may be isolated directly in free base form or in the form of an acid-addition salt, by appropriate adjustment of the pH as desired. The various starting materials and intermediates required to carry out the reactions described in the foregoing are prepared as described in detail hereinafter.

The compounds of the invention can exist in the free base form having formula I above or in the form of an acid-addition salt. Pharmaceutically-acceptable salts are formed as already indicated above or by reaction of the free base with any of a number of inorganic and organic acids, including hydrochloric, hydrobromic, hydriodic, sulfuric, nitric, phosphoric, acetic, benzoic, citric, maleic, malic, tartaric, succinic, gluconic, ascorbic sulfamic, oxalic, pamoic, p-toluenesulfonic, methanesulfonic, benzenesulfonic, and related acids. The free base pyrazolodiazocine compounds and their salts may differ somewhat in certain physical properties, such as solubility in polar solvents, but they are otherwise equivalent for purposes of the invention.

The compounds of the invention can exist in anhydrous form, as well as in solvated, including hydrated, forms. In general, the hydrated forms and the solvated forms with pharmaceutically-acceptable solvents are equivalent to the anhydrous or unsolvated forms for the purposes of the invention.

The compounds of the invention are new chemical compounds that are useful as chemical intermediates and as pharmacological agents. The use of certain of the present compounds as intermediates for the preparation of other compounds of the invention has already been described in the foregoing. As pharmacological agents, the compounds of the invention exhibit antidepressant activity that can be demonstrated and quantitatively determined in a pharmacological assay that measures the ability of a test compound to potentiate the known psychic energizing effect of methamphetamine. This assay is carried out as follows.

Male albino rats are deprived of food and water for 20 hours prior to test. At test time they are dosed intraperitoneally with the test compound, with separate groups of eight rats each receiving a dose of 10, 5, or 2.5 mg./kg. (base). Immediately following dosing the rats are placed in individual metabolism cages without food or water for a waiting period; for half the rats at each dose level the waiting period is 15 minutes, and for the other half it is 2 hours. After the waiting period, all the rats are given an intraperitoneal injection of 0.75 mg./kg. of methamphetamine (base), and then, 20 minutes later, are allowed access to a milk preparation in a graduated and calibrated tube. The preparation consists of one part sweetened condensed milk and two parts water. Total milk ingestion of each animal after 30 minutes, 1 hour, 90 minutes and 2 hours is recorded and compared with that of control animals that are dosed only with methamphetamine. The total ingested after 2 hours is considered the critical amount, and is the one used to assess activity.

A test compound is considered to be an active antidepressant agent in this test if it shows significant methamphetamine potentiation, that is, enhanced inhibition of milk ingestion, at a dose of 10 mg./kg. (base) or less in either of the two groups of rats tested at each dosage level. Highly active antidepressant agents can be further differentiated if they show an increased enhancement of inhibition of milk ingestion in the group of test animals that are subjected to the two-hour waiting period between injections of the test compound and methamphetamine. Thus, since in this test rats dosed only with methamphetamine normally consume an average of 4.2 ml. of milk (per 100 g. of body weight), a test compound is considered to be active if at a dose of 10 mg./kg. (base) or less it leads to ingestion of 3.5 ml. or less in those rats dosed with methamphetamine 15 minutes after injection of the compound; and it is regarded as more highly active if at the same dosage it leads to an even lower ingestion of milk in those animals dosed with methamphetamine after a waiting period of two hours. By utilizing the foregoing test procedure it has been possible to demonstrate activity for the known clinically useful antidepressant agents, amitriptyline and imipramine, thereby confirming the validity of this assay for determining antidepressant activity.

The results obtained in this assay for some representative compounds of the present invention are shown in the following table, where the compounds are identified by reference to the examples that follow. In this table, the amounts of milk ingestion, in ml. per 100 g. of body weight, are given for both groups of rats at the indicated dose level, that is, for the group of rats dosed with methamphetamine 15 minutes after injection of the test compound and for the group dosed with methamphetamine after a two-hour waiting period. It is seen from the table that a number of the present compounds were administered at dosages significantly lower than 2.5 mg./kg. (base) and exhibited activity at those lower dosage levels.

ANTIDEPRESSANT ACTIVITY

| Compound | Dose mg./kg. (base) | Milk Ingestion, ml./100 g., after waiting period of | |
|---|---|---|---|
| | | 15 Min. | 2 Hours |
| Example 1 | 10 | 0.2 | 0.00 |
| | 5 | 0.3 | 0.8 |
| | 2.5 | 0.7 | 0.7 |
| | 1.25 | 0.6 | 0.6 |
| | 0.625 | 0.7 | 0.9 |
| | 0.312 | 0.9 | 1.2 |
| Example 2(e) | 10 | 0.4 | 0.0 |
| | 5 | 0.2 | 0.2 |
| | 2.5 | 0.9 | 0.0 |
| | 1.25 | 0.8 | 0.1 |
| | 0.625 | 0.3 | 0.2 |
| | 0.312 | 1.3 | 0.2 |
| Example 2 (f) | 10 | 0.9 | 0.1 |
| | 5 | 1.1 | 0.3 |
| | 2.5 | 1.4 | 0.2 |
| | 1.25 | 0.0 | 0.0 |
| | 0.625 | 0.2 | 0.9 |
| | 0.312 | 0.6 | 0.6 |
| Example 2(j) | 10 | 0.6 | 0.2 |
| | 5 | 0.1 | 0.8 |
| | 2.5 | 0.2 | 0.0 |
| | 1.25 | 0.1 | 0.1 |
| | 0.625 | 1.2 | 0.6 |
| | 0.312 | 0.4 | 0.5 |
| Example 6 | 5 | 0.1 | 0.7 |
| | 2.5 | 0.1 | 0.0 |
| | 1.25 | 0.0 | 0.0 |
| | 0.625 | 0.0 | 0.0 |
| | 0.312 | 0.0 | 0.0 |
| | 0.156 | 0.2 | 0.0 |
| Example 12 | 5 | 0.3 | 0.0 |
| | 2.5 | 1.0 | 0.0 |
| | 1.25 | 0.8 | 0.0 |
| | 0.625 | 0.7 | 0.7 |
| | 0.312 | 0.0 | 0.8 |
| | 0.156 | 0.5 | 0.6 |
| Example 14 | 5 | 0.4 | 0.0 |
| | 2.5 | 1.5 | 0.9 |
| | 1.25 | 1.1 | 0.3 |
| | 0.625 | 2.0 | 1.1 |
| | 0.312 | 3.7 | 3.7 |
| | 0.156 | 2.8 | 4.4 |
| Example 15(b) | 5 | 0.3 | 0.3 |
| | 2.5 | 0.0 | 0.1 |
| | 1.25 | 0.4 | 0.8 |
| Example 16 | 10 | 0.1 | 1.6 |
| | 5 | 2.9 | 1.6 |
| | 2.5 | 1.5 | 1.0 |
| Example 18(a) | 10 | 0.2 | 0.1 |
| | 5 | 0.6 | 1.0 |
| | 2.5 | 0.1 | 0.6 |
| | 1.25 | 1.2 | 0.6 |
| | 0.625 | 2.4 | 1.3 |
| | 0.312 | 1.5 | 3.2 |
| Example 20(a) | 10 | 2.7 | 0.5 |
| | 5 | 1.9 | 0.5 |
| | 2.5 | 4.5 | 2.6 |
| Example 24(c) | 10 | 0.0 | 0.0 |
| | 5 | 0.8 | 0.2 |
| | 2.5 | 2.2 | 1.1 |
| Example 24(d) | 10 | 1.5 | 0.0 |
| | 5 | 1.6 | 0.1 |
| | 2.5 | 2.2 | 2.0 |
| Imipramine | 10 | 0.0 | 0.0 |
| | 5 | 0.5 | 0.1 |
| | 2.5 | 3.3 | 2.2 |

The compounds of the invention can be administered either orally or parenterally. They can be combined with a solid or liquid carrier or diluent and made available in varying amounts in such pharmaceutical forms as tablets, capsules, powders, and aqueous and non-aqueous suspensions and solutions.

The invention is illustrated by the following examples.

EXAMPLE 1

A mixture of 23.5 g. of 4-benzoyl-5-chloro-1,3-dimethylpyrazole [prepared by method A of J. Org. Chem. 36, 2544 (1971)] and 50 ml. of 1,3-propanediamine is stirred and heated at reflux for 20 hours, then evaporated at reduced pressure. The residue is dissolved in 200 ml. of 2N hydrochloric acid and the solution is washed with ether. The acidic solution is basified with 50 percent aqueous sodium hydroxide, then extracted with dichloromethane. The extract is washed with water, dried and evaporated at reduced pressure to give 6,7,8,9-tetrahydro-1,3-dimethyl-4-phenyl-1H-pyrazolo[3,4-b][1,5]-diazocine as a solid on trituration with petroleum ether; m.p. 121°–124° C. after crystallization from acetone.

EXAMPLE 2

Utilizing the procedure described in Example 1 above, the following 4-arylpyrazolo [3,4-b][1,5]diazocines are obtained from the reactions indicated below.

a. From the reaction of 20 g. of 4-benzoyl-5-chloro-1,3-dimethylpyrazole and 30 ml. of 1,3-butanediamine, there is obtained 6,7,8,9-tetrahydro-1,3,6-trimethyl-4-phenyl-1H-pyrazolo[3,4-b][1,5]diazocine; m.p. 108°–110° C. after crystallization from ether.

b. From the reaction of 12 g. of 4-benzoyl-5-chloro-1,3-dimethylpyrazole and 20 ml. of 2-isopropyl-1,3-propanediamine, there is obtained 6,7,8,9-tetrahydro-7-isopropyl-1,3-dimethyl-4-phenyl-1H-pyrazolo[3,4-b][1,5]diazocine; m.p. 162°–164° C. after crystallization from ether.

c. From the reaction of 12 g. of 4-benzolyl-5-chloro-1,3-dimethylpyrazole and 15 g. of 2-ethyl-1,3-propanediamine, there is obtained 7-ethyl-6,7,8,9-tetrahydro-1,3-dimethyl-4-phenyl-1H-pyrazolo-[3,4-b][1,5]diazocine; m.p. 166°–167° C. after crystallization from ether.

d. From the reaction of 12 g. of 4-benzoyl-5-chloro-1,3-dimethylpyrazole and 15 g. of 2,2-dimethyl-1,3-propanediamine (C.A. 51, 5087a), there is obtained 6,7,8,9-tetrahydro-1,3,7,7-tetramethyl-4-phenyl-1H-pyrazolo[3,4-b][1,5]diazocine; m.p. 182°–183° C. after crystallization from ether.

e. From the reaction of 13.5 g. of 5-chloro-4-(m-chlorobenzoyl)-1,3-dimethylpyrazole [prepared by method A of J. Org. Chem. 36, 2544 (1971)] and 15 ml. of 1,3-butanediamine, there is obtained 4-(m-chlorophenyl)-6,7,8,9-tetrahydro-1,3,6-trimethyl-1H-pyrazolo[3,4-b][1,5]diazocine; m.p. 131°–134° C. after crystallization from ether-petroleum ether.

f. From the reaction of 13 g. of 5-chloro-4-(m-fluorobenzoyl)-1,3-dimethylpyrazole [prepared by the method A of J. Org. Chem. 36, 2544 (1971)] and 25 ml. of 1,3-propanediamine, there is obtained 4-(m-fluorophenyl)-6,7,8,9-tetrahydro-1,3-dimethyl-1H-pyrazolo[3,4-b][1,5]diazocine as the hemihydrate after crystallization from ether-petroleum ether; m.p. 112°–115° C.

g. From the reaction of 16 g. of 4-(m-bromobenzoyl)-5-chloro-1,3-dimethylpyrazole and 30 ml. of 1,3-propanediamine, there is obtained 4-(m-bromophenyl)-6,7,8,9-tetrahydro-1,3-dimethyl-1H-pyrazolo[3,4-b][1,5]diazocine; m.p. 173°–175° C. after crystallization from acetone.

h. From the reaction of 12 g. of 4-(m-bromobenzoyl)-5-chloro-3-ethyl-1-methylpyrazole and 15 ml. of 1,3-propanediamine, there is obtained the free base 4-(m-bromophenyl)-3-ethyl-6,7,8,9-tetrahydro-1-methyl-1H-pyrazolo[3,4-b][1,5]diazocine. The free base is dissolved in acetone and one equivalent of 20 percent hydrogen chloride in 2-propanol is added. The solid that precipitates is isolated by filtration and dried. It is the monohydrochloride salt of 4-(m-bromophenyl)-3-ethyl-6,7,8,9-tetrahydro-1-methyl-1H-pyrazolo[3,4-b][1,5]diazocine; m.p. 288°–290° C.

i. From the reaction of 13 g. of 5-chloro-1,3-dimethyl-4-(m-toluyl)pyrazole [prepared by method A of J. Org. Chem. 36, 2544 (1971)] and 35 ml. of 1,3-propanediamine, there is obtained 6,7,8,9-tetrahydro-1,3-dimethyl-4-(m-tolyl)-1H-pyrazolo[3,4-b][1,5]diazocine; m.p. 146°–148° C. after crystallization from acetone.

j. From the reaction of 20 g. of 5-chloro-4-(p-chlorobenzoyl)-1,3-dimethylpyrazole [prepared by method A of J. Org. Chem. 36, 2544 (1971)] and 30 ml. of 1,3-propanediamine, there is obtained 4-(p-chlorophenyl)-6,7,8,9-tetrahydro-1,3-dimethyl-1H-pyrazolo[3,4-b][1,5]diazocine; m.p. 151°–153° C. from etherpetroleum ether.

k. From the reaction of 20 g. of 5-chloro-4-(p-chlorobenzoyl)-1-ethyl-3-methylpyrazole and 30 ml. of 1,3-propanediamine, there is obtained 4-(p-chlorophenyl)-1-ethyl-6,7,8,9-tetrahydro-3-methyl-1H-pyrazolo[3,4-b][1,5]-diazocine as an oil. For purification the oily free base is dissolved in ether, the solution is passed through a column of activated magnesium silicate (Florisil) and the eluate evaporated. The residue is dissolved in acetone and the solution treated with an excess of 20 percent hydrogen chloride in 2-propanol to precipitate the dihydrochloride salt of 4-(p-chlorophenyl)-1-ethyl-6,7,8,9-tetrahydro-3-methyl-1H-pyrazolo[3,4-b][1,5]diazocine, which is collected; m.p. 250° C. (dec.).

l. From the reaction of 20 g. of 5-chloro-4-(p-chlorobenzoyl)-3-ethyl-1-methylpyrazole and 30 ml. of 1,3-propanediamine, there is obtained the free base 4-(p-chlorophenyl)-3-ethyl-6,7,8,9-tetrahydro-1-methyl-1H-pyrazolo[3,4-b][1,5]diazocine. For purification, the free base is dissolved in tetrahydrofuran, the solution is passed through a column of activated magnesium silicate (Florisil) and the eluate evaporated. The purified free base has a melting point range of 70°–75° C.

m. From the reaction of 12 g. of 5-chloro-4-(3,4-dichlorobenzoyl)-1,3-dimethylpyrazole and 30 ml. of 1,3-propanediamine, there is obtained the free base 4-(3,4-dichlorophenyl)-6,7,8,9-tetrahydro-1,3-dimethyl-1H-pyrazolo-[3,4-b][1,5]diazocine. For purification, the free base is dissolved in 20 ml. of acetone and one equivalent of 20 percent hydrogen chloride in 2-propanol is added to precipitate the monohydrochloride salt, which is obtained as a monohydrate; m.p. 255° C. (dec.).

n. From the reaction of 18 g. of 5-chloro-1,3-dimethyl-4-(2-thenoyl)pyrazole [prepared by method B of J. Org. Chem. 36, 2544 (1971)] and 30 ml. of 1,3-propanediamine, there is obtained 6,7,8,9-tetrahydro-1,3-dimethyl-4-(2-thienyl)-1H-pyrazolo[3,4-b][1,5]-diazocine; m.p. 185°–186° C. after crystallization from acetone.

o. From the reaction of 12 g. of 5-chloro-1,3-dimethyl-4-picolinoylpyrazole and 20 ml. of 1,3-propanediamine, there is obtained 6,7,8,9-tetrahydro-1,3-dimethyl-4-(2-pyridyl)-1H-pyrazolo[3,4-b][1,5]diazocine; m.p. 198°–200° C. after crystallization from chloroformether.

p. From the reaction of 12 g. of 5-chloro-4-(cyclohexanecarbonyl)-1,3-dimethylpyrazole and 20 ml. of 1,3-propanediamine, there is obtained 4-cyclohexyl-6,7,8,9-tetrahydro-1,3-dimethyl-1H-pyrazolo[3,4-b][1,5]diazocine; m.p. 162°–163° C. after crystallization from ether.

q. From the reaction of 18 g. of 5-chloro-1-ethyl-3-methyl-4-(2-thenoyl)pyrazole and 30 ml. of 1,3-propanediamine, there is obtained 1-ethyl-6,7,8,9-tetrahydro-3-methyl-4-(2-thienyl)-1H-pyrazolo[3,4-b][1,5]diazocine; m.p. 168°–170° C. after crystallization from cyclohexane.

EXAMPLE 3

A mixture of 20 g. of 4-benzoyl-5-chloro-1,3-dimethylpyrazole, 15 ml. of N-methyl-1,3-propanediamine and 20 ml. of hexamethylphosphoramide is heated at 165° C. for 20 hours, cooled and poured into 350 ml. of ice cold dilute aqueous ammonia. The mixture is extracted with ether and the ether extract in turn extracted with 200 ml. of 1N hydrochloric acid. The acidic aqueous extract is basified with concentrated aqueous sodium hydroxide and extracted with dichloromethane. The dichloromethane extract is evaporated at reduced pressure and the residue dissolved in ether. The ether solution is passed through a column of activated magnesium silicate (Florisil) and the eluate is evaporated to give 6,7,8,9-tetrahydro-1,3,9-trimethyl-4-phenyl-1H-pyrazolo[3,4-b][1,5]diazocine. This free base is dissolved in tetrahydrofuran and two equivalents of 20 percent hydrogen chloride in 2-propanol are added to the solution. The product, 6,7,8,9-tetrahydro-1,3,9-trimethyl-4-phenyl-1H-pyrazolo[3,4-b][1,5]diazocine, dihydrochloride, is collected by filtration and dried; m.p. 200° C. (dec.).

EXAMPLE 4

Utilizing the procedure described in Example 3, the following 4-arylpyrazolo[3,4-b][1,5]diazocine compounds are obtained from the reactions indicated below.

a. From the reaction of 13.5 g. of 5-chloro-4-(m-chlorobenzoyl)-1,3-dimethylpyrazole and 12 g. of 2-isopropyl-1,3-propanediamine in 40 ml. of N-methyl-2-pyrrolidinone, there is obtained 4-(m-chlorophenyl)-6,7,8,9-tetrahydro-7-isopropyl-1,3-dimethyl-1H-pyrazolo[3,4-b][1,5]diazocine; m.p. 154°–155° C. after crystallization from ether.

b. From the reaction of 20 g. of 5-chloro-4-(m-flurobenzoyl)-1,3-dimethylpyrazole and 15 ml. of N-methyl-1,3-propanediamine in 20 ml. of hexamethylphosphoramide, there is obtained 4-(m-fluorophenyl)-6,7,8,9-tetrahydro-1,3,9-trimethyl-1H-pyrazolo-[3,4-b][1,5]diazocine; the dihydrochloride salt, obtained by the procedure of Example 3, melts at 172°–174° C.

EXAMPLE 5

A mixture of 3.5 g. of 4-benzoyl-5-chloro-1-methyl-3-nitropyrazole and 12 ml. of 1,3-propanediamine is stirred and heated at reflux for 8 hours, then evaporated at reduced pressure. The residue is dissolved in 100 ml. of 1N hydrochloric acid and the solution is basified with concentrated aqueous ammonia. The resulting precipitate of 6,7,8,9-tetrahydro-1-methyl-3-nitro-4-phenyl-1H-pyrazolo-[3,4-b][1,5]diazocine is collected by filtration and crystallized from methanol; m.p. 263°–265° C.

EXAMPLE 6

A mixture of 30 g. of 5-chloro-1,3-dimethyl-4-(α,α,α-trifluoro-m-toluyl)pyrazole [prepared by method B of J. Org. Chem. 36, 2544 (1971)] and 45 ml. of 1,3-propanediamine is heated at reflux for 16 hours then evaporated at reduced pressure. The residue is dissolved in excess 1N hydrochloric acid and the solution washed with ether. The acidic aqueous solution is basified with concentrated aqueous ammonia and extracted with dichloromethane. The dichloromethane extract is washed with saturated aqueous sodium chloride, dried and evaporated at reduced pressure to give 6,7,8,9-tetrahydro-1,3-dimethyl-4-(α,α,α-trifluoro-m-tolyl)-1H-pyrazolo[3,4-b][1,5]diazocine; m.p. 146°–147° C. after crystallization from acetone-cyclohexane. When crystallized from acetonitrile, this same base melts at 151°–153° C. To obtain the corresponding monohydrochloride, the free base is dissolved in acetone and treated with one equivalent of 20 percent hydrogen chloride in 2-propanol. The product which separates, 6,7,8,9-tetrahydro-1,3-dimethyl-4-(α,α,α-trifluoro-m-tolyl)-1H-pyrazolo-[3,4-b][1,5]diazocine, monohydrochloride, is collected by filtration and dried; m.p. 291°–293° C. To obtain the maleate salt, a solution of the free base in acetonitrile is mixed with a solution of one equivalent of maleic acid in acetonitrile. The resulting mixture is diluted with ether and cooled to 0°–5° C. The product which separates, 6,7,8,9-tetrahydro-1,3-dimethyl-4-(α,α,α-trifluoro-m-tolyl)-1H-pyrazolo[3,4-b][1,5]diazocine, monomaleate, is collected by filtration, washed with ether, and dried.

EXAMPLE 7

Utilizing the procedure described in Example 6, the following 4-arylpyrazolo[3,4-b][1,5]diazocine compounds are obtained from the following reactions.

a. From the reaction of 23.7 g. of 5-chloro-1-ethyl-3-methyl-4-(α,α,α-trifluoro-m-toluyl)pyrazole and 50 ml. of 1,3-propanediamine, there is obtained 1-ethyl-6,7,8,9-tetrahydro-3-methyl-4-(α,α,α-trifluoro-m-tolyl)-1H-pyrazolo[3,4-b][1,5]-diazocine; m.p. 111°–113° C. after crystallization from petroleum ether.

b. From the reaction of 20 g. of 5-chloro-3-ethyl-1-methyl-4-(α,α,α-trifluoro-m-toluyl)pyrazole and 30 ml. of 1,3-propanediamine, there is obtained 3-ethyl-6,7,8,9-tetrahydro-1-methyl-4-(α,α,α-trifluoro-m-tolyl)-1H-pyrazolo[3,4-b][1,5]diazocine as a monohydrate; m.p. 112°–114° C. after crystallization from aqueous acetonitrile. The monohydrochloride salt, prepared following the procedure of Example 6, melts at 285° C.

EXAMPLE 8

A mixture of 9 g. of 5-chloro-4-(m-chlorobenzoyl)-1,3-dimethylpyrazole and 20 ml. of 1,3-propanediamine is heated at reflux for 6.5 hours, cooled, diluted with 200 ml. of water and extracted with dichloromethane. The dichloromethane extract is washed with water, dried and evaporated to give 4-(m-chlorophenyl)-6,7,8,9-tetrahydro-1,3-dimethyl-1H-pyrazolo[3,4-b][1,5]diazocine; m.p. 156°–159° C. after crystallization from acetone. The monohydrochloride salt is prepared by adding one equivalent of a solution of 20 percent hydrogen chloride in 2-propanol to a solution of the free base in acetone followed by dilution with tetrahydrofuran; the precipitated salt melts at 305° C. (dec.). The monoformate salt is prepared by dissolving 1 g. of the free base in 5 ml. of 90 percent formic acid and evaporating the solution; m.p. 168°–170° C. after crystallization from methanol-acetone.

EXAMPLE 9

A solution of 27 g. of 5-chloro-4-(o-chlorobenzoyl)-1,3-dimethylpyrazole [prepared by method A of J. Org. Chem. 36, 2544 (1971)] and 15 g. of 1,3-propanediamine in 40 ml. of N-methyl-2-pyrrolidinone is stirred and heated at 140°–150° C. for 18 hours, then cooled and poured into 400 ml. of cold dilute aqueous ammonia. The resulting oil is separated, dissolved in 200 ml. of 1N hydrochloric acid and the solution washed with ether. the acidic aqueous solution is basified with concentrated aqueous ammonia and extracted with dichloromethane. The dichloromethane extract is washed with water, dried and evaporated to give 4-(o-chlorophenyl)-6,7,8,9-tetrahydro-1,3-dimethyl-1H-pyrazolo[3,4-b][1,5]diazocine; m.p. 164°–166° C. after crystallization from ether.

EXAMPLE 10

A mixture of 18 g. of 5-chloro-1,3-dimethyl-4-(p-methoxybenzimidoyl)pyrazole [J. Org. Chem. 36, 2545 (1971)] and 30 ml. of 1,3-propanediamine is stirred and heated at reflux for 20 hours, then evaporated at reduced pressure. The residue is stirred with dilute aqueous ammonia and the mixture is extracted with benzene. The benzene solution is extracted with 200 ml. of 1N hydrochloric acid. The acidic aqueous solution is basified with concentrated aqueous sodium hydroxide and extracted with dichloromethane. The dichloromethane extract is washed with water, dried and evaporated at reduced pressure to give 6,7,8,9-tetrahydro-4-(p-methoxyphenyl)-1,3-dimethyl-1H-pyrazolo[3,4-b][1,5]diazocine as a hemihydrate; m.p. 120°–122° C. after crystallization from ether. To obtain the citrate salt, solutions of equivalent amounts of the free base and citric acid in acetone are mixed and the citrate salt which separates is collected.

EXAMPLE 11

A mixture of 25 g. of 5-chloro-1,3-dimethyl-4-($\alpha,\alpha,\alpha$-trifluoro-p-toluyl)pyrazole and 50 ml. of 1,3-propanediamine is heated at reflux for 20 hours, then evaporated at reduced pressure to give a residue of 6,7,8,9-tetrahydro-1,3-dimethyl-4-($\alpha,\alpha,\alpha$-trifluoro-p-tolyl)-1H-pyrazolo[3,4-b][1,5]diazocine which is washed thoroughly with water and dried; m.p. 70° C. after crystallization from 2,2,4-trimethylpentane. The free base is dissolved in acetone and the solution treated with an excess of 20 percent hydrogen chloride in 2-propanol to precipitate the dihydrochloride salt; m.p. 320°–321° C. The hydrobromide salt is obtained by dissolving the free base in ether and adding an alcoholic solution of one equivalent of anhydrous hydrogen bromide.

EXAMPLE 12

A solution of 16 g. of 6,7,8,9-tetrahydro-1,3-dimethyl-4-($\alpha,\alpha,\alpha$-trifluoro-m-tolyl)-1H-pyrazolo[3,4-b][1,5]-diazocine and 12 ml. of bromomethane in 150 ml. of dimethylformamide is cooled to 0° C. and 3 g. of a 50% sodium hydride dispersion in mineral oil is added in portions under a nitrogen atmosphere. The mixture is stirred for 16 hours while allowing the temperature to slowly rise to 20°–25° C., then evaporated at reduced pressure. The residue is partitioned between 150 ml. of water and 150 ml. of ether. The organic phase is separated, washed with water, dried and evaporated to give 6,7,8,9-tetrahydro1,3,9-trimethyl-4-($\alpha,\alpha,\alpha$-trifluoro-m-tolyl)-1H-pyrazolo-[3,4-b][1,5]diazocine; m.p. 98°–99° C. after crystallization from petroleum ether. The salt with p-toluenesulfonic acid is obtained by mixing solutions of equivalents of the acid and the free base in alcohol-ether and diluting the mixture with ether.

EXAMPLE 13 a. A solution of 20 g. of 6,7,8,9-tetrahydro-1,3-dimethyl-4-($\alpha,\alpha,\alpha$-trifluoro-m-tolyl)-1H-pyrazolo[3,4-b]-[1,5]diazocine and 25 g. of bromoethane in 200 ml. of dimethylformamide is cooled to 10° C. and 4 g. of a 50 percent sodium hydride dispersion in mineral oil is added in portions under a nitrogen atmosphere. The mixture is stirred for 16 hours while allowing the temperature to slowly rise to 20°–25° C., then evaporated at reduced pressure. The residue is dissolved in 200 ml. of 1N hydrochloric acid and the solution washed with ether. The acidic aqueous solution is basified with concentrated aqueous ammonia and extracted with dichloromethane. The extract is washed with saturated aqueous sodium chloride, dried and evaporated at reduced pressure. The residual oil is dissolved in ether and the solution filtered through neutral alumina. The filtrate is evaporated to give 9-ethyl-6,7,8,9-tetrahydro-1,3-dimethyl-4-($\alpha,\alpha,\alpha$-trifluoro-m-tolyl)-1H-pyrazolo[3,4-b][1,5]diazocine. This free base is dissolved in 100 ml. of tetrahydrofuran and the solution is treated with 20 ml. of 20 percent hydrogen chloride and 2-propanol. The precipitated dihydrochloride salt, obtained as a hemihydrate, is collected by filtration and dried; m.p. 131°–133° C. To obtain the citrate salt, solutions of equivalent amounts of the free base and citric acid in acetone are mixed and the citrate salt which separates is collected.

b. From the reaction of 18 g. of 4-(m-chlorophenyl)-6,7,8,9-tetrahydro-1,3-dimethyl-1H-pyrazolo[3,4-b][1,5]diazocine, 15 g. of iodomethane and 4 g. of a 50 percent sodium hydride dispersion in mineral oil, in 200 ml. of dimethylformamide, following the procedure of paragraph (13a) above, there is obtained 4-(m-chlorophenyl)-6,7,8,9-tetrahydro-1,3,9-trimethyl-1H-pyrazolo[3,4-b][1,5]diazocine; m.p. 143°–145° C. after crystallization from ether.

EXAMPLE 14

A solution of 9 g. of 4-(m-chlorophenyl)-6,7,8,9-tetrahydro-1,3-dimethyl-1H-pyrazolo[3,4-b][1,5]diazocine and 15 ml. of 1-(2-chloroethyl)pyrrolidine in 80 ml. of dimethylformamide is cooled to 15°–20° C. and 2.5 g. of a 50 percent sodium hydride dispersion in mineral oil is added in portions under a nitrogen atmosphere. The resulting mixture is stirred and heated at 50° C. for 16 hours, then evaporated at reduced pressure. The residue is dissolved in 200 ml. of 1N hydrochloric acid and the solution is washed with ether. The acidic aqueous solution is basified with concentrated aqueous sodium hydroxide and extracted with 200 ml. of dichloromethane. The dichloromethane extract is washed with water, dried and evaporated at reduced pressure to give 4-(m-chlorophenyl)-6,7,8,9-tetrahydro-1,3-dimethyl-9-[2-(1-pyrrolidinyl)ethyl]-1H-pyrazolo[3,4-b][1,5]diazocine. This free base is dissolved in 50 ml. of tetrahydrofuran; 4 ml. of methanol is added followed by 15 ml. of 20 percent hydrogen chloride in 2-propanol. The mixture is chilled and the precipitate of trihydrochloride salt is collected and dried; m.p. 180° C. (dec.).

EXAMPLE 15 a. From the reaction of 15 g. of 4-(m-chlorophenyl)-6,7,8,9-tetrahydro-1,3-dimethyl-1H-pyrazolo[3,4-b][1,5]diazocine, 20 ml. of N,N-dimethyl-3-chloropropylamine and 4 g. of a 50 percent mineral oil dispersion of sodium hydride, in 80 ml. of dimethylformamide, following the procedure of Example 14, there is obtained 4-(m-chlorophenyl)-9-[3-(dimethylamino)propyl]-6,7,8,9-tetrahydro-1,3-dimethyl-1H-pyrazolo[3,4-b][1,5]diazocine as the trihydrochloride salt; m.p. 190°-192° C. This salt is dissolved in 100 ml. of water, the solution is basified with concentrated aqueous sodium hydroxide and extracted with dichloromethane. The dichloromethane extract is washed with water, dried and evaporated to give the free base; m.p. 76°-78° C. after crystallization from petroleum ether.

b. From the reaction of 9 g. of 4-(m-chlorophenyl)-6,7,8,9-tetrahydro-1,3-dimethyl-1H-pyrazolo[3,4-b][1,5]diazocine, 15 ml. of 2-chlorotriethylamine and 2.5 g. of a 50 percent mineral oil dispersion of sodium hydride, in 80 ml. of dimethylformamide, following the procedure of Example 14, there is obtained 4-(m-chlorophenyl)-9-[2-(diethylamino)ethyl]-6,7,8,9-tetrahydro-1,3-dimethyl-1H-pyrazolo[3,4-b][1,5]diazocine, trihydrochloride; m.p. 175°-177° C.

c. From the reaction of 7 g. of 4-(p-chlorophenyl)-6,7,8,9-tetrahydro-1,3-dimethyl-1H-pyrazolo[3,4-b][1,5]diazocine, 10 ml. of N,N-dimethyl-3-chloropropylamine and 2.5 g. of a 50 percent mineral oil dispersion of sodium hydride, in 80 ml. of dimethylformamide, following the procedure of Example 14, there is obtained 4-(p-chlorophenyl)-9-[3-(dimethylamino)propyl]-6,7,8,9-tetrahydro-1,3-dimethyl-1H-pyrazolo[3,4-b][1,5]diazocine; m.p. 94°-96° C. after crystallization from petroleum ether.

d. From the reaction of 11.9 g. of 4-(m-bromophenyl)-6,7,8,9-tetrahydro-1,3-dimethyl-1H-pyrazolo[3,4-b][1,5]diazocine, 15 ml. of N,N-dimethyl-3-chloropropylamine and 2.8 g. of a 50 percent mineral oil dispersion of sodium hydride, in 55 ml. of dimethylformamide, following the procedure of Example 14, there is obtained 4-(m-bromophenyl)-9-[3-(dimethylamino)propyl]-6,7,8,9-tetrahydro-1,3-dimethyl-1H-pyrazolo[3,4-b][1,5]diazocine; m.p. 81°-83° C. after crystallization from petroleum ether.

e. From the reaction of 11.3 g. of 6,7,8,9-tetrahydro-1,3-dimethyl-4-($\alpha,\alpha$,$\alpha$-trifluoro-m-tolyl)-1H-pyrazolo[3,4-b][1,5]diazocine, 15 ml. of N,N-dimethyl-3-chloropropylamine and 2.8 g. of a 50 percent mineral oil dispersion of sodium hydride, in 50 ml. of dimethylformimide, following the procedure of Example 14, there is obtained 9-[3-(dimethylamino)propyl]-6,7,8,9-tetrahydro-1,3-dimethyl-4-($\alpha,\alpha,\alpha$-trifluoro-m-tolyl)-1H-pyrazolo[3,4-b][1,5]diazocine; trihydrochloride; m.p. 170° C. (dec.). To obtain the free base, an aqueous solution of the salt is made basic with concentrated aqueous sodium hydroxide and extracted with dichloromethane. The extract is washed with water, dried and evaporated to give the free base. To obtain the sulfate, the free base is dissolved in an equivalent of 1N sulfuric acid, the solution is freeze-dried and lyophilized to give the sulfate as an amorphous powder.

f. From the reaction of 8.5 g. of 6,7,8,9-tetrahydro-1,3-dimethyl-4-(2-thienyl)-1H-pyrazolo[3,4-b][1,5]diazocine, 15 ml. of N,N-dimethyl-3-chloropropylamine and 2.8 g. of a 50 percent mineral oil dispersion of sodium hydride, in 60 ml. of dimethylformamide, following the procedure of Example 14, there is obtained 9-[3-(dimethylamino)propyl]-6,7,8,9-tetrahydro-1,3-dimethyl-4-(2-thienyl)-1H-pyrazolo[3,4-b][1,5]diazocine, trihydrochloride; m.p. 190°-192° C.

EXAMPLE 16

To a solution of 6.4 g. of 6,7,8,9-tetrahydro-1,3-dimethyl-4-phenyl-1H-pyrazolo[3,4-b][1,5]diazocine in 13 ml. of glacial acetic acid, maintained at 5°-10° C., is added dropwise 25 ml. of concentrated sulfuric acid, then a solution of 3 g. of potassium nitrate in 13 ml. of concentrated sulfuric acid. The mixture is stirred at 5°-10° C. for 1 hour, then at 20°-25° C. for 3 hours and poured onto 500 g. of chipped ice. The mixture is basified with concentrated aqueous ammonia. The resulting precipitate of 6,7,8,9-tetrahydro-1,3-dimethyl-9-nitro-4-phenyl-1H-pyrazolo[3,4-b][1,5]diazocine is collected by filtration, washed with water and dried; m.p. 129°-131° C. after crystallization from 2-propanol.

EXAMPLE 17

A solution of 10 g. of 6,7,8,9-tetrahydro-1,3-dimethyl-4-($\alpha,\alpha,\alpha$-trifluoro-m-tolyl)-1H-pyrazolo[3,4-b][1,5]diazocine and 7 ml. of trifluoroacetic anhydride in 100 ml. of 1,2-dichloroethane is allowed to stand 16 hours at room temperature 20°-25° C.) and then is evaporated at reduced pressure. The residue is dissolved in dichloromethane and the solution is washed with saturated aqueous sodium bicarbonate, with water, dried and evaporated at reduced pressure to give 6,7,8,9-tetrahydro-1,3-dimethyl-9-(trifluoroacetyl)-4-($\alpha,\alpha,\alpha$-trifluoro-m-tolyl)-1H-pyrazolo[3,4-b][1,5]diazocine; m.p. 115°-117° C. after crystallization from etherpetroleum ether.

EXAMPLE 18

Utilizing the procedure described in Example 17, the following 4-arylpyrazolo[3,4-b][1,5]diazocine compounds are obtained from the reactions indicated below.

a. From the reaction of 9 g. of 4-(m-chlorophenyl)-6,7,8,9-tetrahydro-1,3-diethyl-1H-pyrazolo[3,4-b][1,5]diazocine and 7 ml. of trifluoroacetic anhydride in 100 ml. of 1,2-dichloroethane, there is obtained 4-(m-chlorophenyl)-6,7,8,9-tetrahydro-1,3-dimethyl-9-(trifluoroacetyl)-1H-pyrazolo[3,4-b][1,5]diazocine; m.p. 139°-141° C. after crystallization from petroleum ether.

b. From the reaction of 9.4 g. of 4-(m-chlorophenyl)-6,7,8,9-tetrahydro-1,3,6-trimethyl-1H-pyrazolo[3,4-b][1,5]diazocine and 7 ml. of trifluoroacetic anhydride in 100 ml. of 1,2-dichloroethane, there is obtained 4-(m-chlorophenyl)-6,7,8,9-tetrahydro-1,3,6-trimethyl-9-(trifluoroacetyl)-1H-pyrazolo[3,4-b][1,5]diazocine; m.p. 151°–153° C. after crystallization from ether-petroleum ether.

c. From the reaction of 10 g. of 4-(m-bromophenyl)-6,7,8,9-tetrahydro-1,3-dimethyl-1H-pyrazolo[3,4-b][1,5]diazocine and 9 ml. of trifluoroacetic anhydride in 100 ml. of 1,2-dichloroethane, there is obtained 4-(m-bromophenyl)-6,7,8,9-tetrahydro-1,3-dimethyl-9-(trifluoroacetyl)-1H-pyrazolo[3,4-b][1,5]diazocine; m.p. 138°–140° C. after crystallization from ether-petroleum ether.

d. From the reaction of 5 g. of 4-(p-chlorophenyl)-6,7,8,9-tetrahydro-1,3-dimethyl-1H-pyrazolo[3,4-b][1,5]diazocine and 5 ml. of trifluoroacetic anhydride in 75 ml. of 1,2-dichloroethane, there is obtained 4-(p-chlorophenyl)-6,7,8,9-tetrahydro-1,3-dimethyl-9-(trifluoroacetyl)-1H-pyrazolo[3,4-b][1,5]diazocine; m.p. 164°–166° C. after crystallization from ether-petroleum ether.

e. From the reaction of 5 g. of 4-(p-chlorophenyl)-3-ethyl-6,7,8,9-tetrahydro-1-methyl-1H-pyrazolo[3,4-b][1,5]diazocine and 5 ml. of trifluoroacetic anhydride in 75 ml. of 1,3-dichloroethane, there is obtained 4-(p-chlorophenyl)-3-ethyl-6,7,8,9-tetrahydro-1-methyl-9-(trifluoroacetyl)-1H-pyrazolo[3,4-b][1,5]diazocine; m.p. 111°–113° C. after crystallization from ether-petroleum ether.

EXAMPLE 19

A solution of 9.5 g. of 6,7,8,9-tetrahydro-1,3-dimethyl-9-(trifluoroacetyl)-4-(α,α,α-trifluoro-m-tolyl)-1H-pyrazolo[3,4-b][1,5]diazocine and 5.2 g. of 85 percent m-chloroperbenzoic acid in 250 ml. of chloroform is allowed to stand at room temperature (20°–25° C.) for 16 hours. The solution is washed with saturated aqueous sodium bicarbonate, with water, dried and evaporated at reduced pressure to give 6,7,8,9-tetrahydro-1,3-dimethyl-9-(trifluoroacetyl)-4-(α,α,α-trifluoro-m-tolyl)-1H-pyrazolo[3,4-b][1,5]diazocine, 5-oxide; m.p. 154°–156° C. after crystallization from ether-petroleum ether.

EXAMPLE 20

In a similar manner to that of Example 19, other 9-(trifluoroacetyl)pyrazolodiazocine 5-oxides are obtained by the following procedures:

a. From the reaction of 8.5 g. of 4-(m-chlorophenyl)-6,7,8,9-tetrahydro-1,3-dimethyl-9-(trifluoroacetyl)-1H-pyrazolo[3,4-b][1,5]diazocine and 5.2 g. of 85 percent m-chloroperbenzoic acid in 250 ml. of chloroform there is obtained 4-(m-chlorophenyl)-6,7,8,9-tetrahydro-1,3-dimethyl-9-(trifluoroacetyl)-1H-pyrazolo[3,4-b][1,5]diazocine, 5 oxide; m.p. 145°–147° C. after crystallization from ether.

b. From the reaction of 5.4 g. of 4-(m-chlorophenyl)-6,7,8,9-tetrahydro-1,3,6-trimethyl-9-(trifluoroacetyl)-1H-pyrazolo[3,4-b][1,5]diazocine and 3.4 g. of m-chloroperbenzoic acid in 250 ml. of chloroform there is obtained 4-(m-chlorophenyl)-6,7,8,9-tetrahydro-1,3,6-trimethyl-9-(trifluoroacetyl)-1H-pyrazolo[3,4-b][1,5]diazocine, 5-oxide; m.p. 157°–160° C. after crystallization from ether-petroleum ether.

c. From the reaction of 10.5 g. of 4-(m-bromophenyl)-6,7,8,9-tetrahydro-1,3-dimethyl-9-(trifluoroacetyl)-1H-pyrazolo[3,4-b][1,5]diazocine and 5.5 g. of 85 percent perbenzoic acid in 150 ml. of chloroform there is obtained 4-(m-bromophenyl)-6,7,8,9-tetrahydro-1,3-dimethyl-9-(trifluoroacetyl)-1H-pyrazolo[3,4-b][1,5]diazocine, 5-oxide; m.p. 146°–147° C. after crystallization from ether.

d. From the reaction of 8.0 g. of 4-(p-chlorophenyl)-6,7,8,9-tetrahydro-1,3-dimethyl-9-(trifluoroacetyl)-1H-pyrazolo[3,4-b][1,5]diazocine and 5.2 g. of 85 percent m-chloroperbenzoic acid in 250 ml. of chloroform there is obtained 4-(p-chlorophenyl)-6,7,8,9-tetrahydro-1,3-dimethyl-9-(trifluoroacetyl)-1H-pyrazolo[3,4-b][1,5]diazocine, 5-oxide; m.p. 168°–170°C. after crystallization from ethyl acetate-petroleum ether.

EXAMPLE 21

A solution of 4.5 g. of 4-(m-chlorophenyl)-6,7,8,9-tetrahydro-1,3,9-trimethyl-1H-pyrazolo[3,4-b][1,5]diazocine and 3 g. of 85 percent m-chloroperbenzoic acid in 100 ml. of chloroform is allowed to stand at room temperature (20°–25°C.) for 24 hours. The solution is washed with saturated aqueous sodium bicarbonate, with water, dried and evaporated at reduced pressure to give 4-(m-chlorophenyl)6,7,8,9-tetrahydro-1,3,9-trimethyl-1H-pyrazolo[3,4-b][1,5]diazocine, 5-oxide; m.p. 126°–128°C. after crystallization from ether-petroleum ether.

EXAMPLE 22

A solution of 4.3 g. of 4-(m-chlorophenyl)-6,7,8,9-tetrahydro-1,3-dimethyl-1H-pyrazolo[3,4-b][1,5]diazocine and 3 g. of 85 percent m-chloroperbenzoic acid in 120 ml. of chloroform is allowed to stand at room temperature for 16 hours. The solution is washed with saturated aqueous sodium bicarbonate, with water, dried and evaporated at reduced pressure to give 4-(m-chlorophenyl)-6,7,8,9-tetrahydro-1,3-dimethyl-1H-pyrazolo[3,4-b][1,5]diazocine, 5-oxide; m.p. 200°–202°C. after crystallization from acetone.

EXAMPLE 23

A solution of 6 g. of 6,7,8,9-tetrahydro-1,3-dimethyl-9-(trifluoroacetyl)-4-(α,α,α-trifluoro-m-tolyl)-1H-pyrazolo[3,4-b][1,5]diazocine, 5-oxide and 20 ml. of concentrated aqueous ammonia in 40 ml. of methanol is allowed to stand at room temperature (20°–25°C.) for 16 hours. The solution is evaporated at reduced pressure and the residue extracted with dichloromethane. The dichloromethane extract is washed with water, dried and evaporated at reduced pressure to give 6,7,8,9-tetrahydro-1,3-dimethyl-4-(aα,α,α-trifluoro-m-tolyl-1H-pyrazolo[3,4-b][1,5]diazocine, 5-oxide; m.p. 199°–201°C. after crystallization from acetone-ether.

EXAMPLE 24

Utilizing the procedure described in Example 23, other pyrazolodiazocine 5-oxides are obtained from the following reactions:

a. From the reaction of 5.5 g. of 4-(m-chlorophenyl)-6,7,8,9-tetrahydro-1,3-dimethyl-9-(trifluoroacetyl)-1H-pyrazolo[3,4-b][1,5]diazocine, 5-oxide and 20 ml. of concentrated aqueous ammonia in 35 ml. of methanol, there is obtained 4-(m-chlorophenyl)-6,7,8,9- tetrahydro-1,3-dimethyl-1H-pyrazolo[3,4-b][1,5]diazocine, 5-oxide; m.p. 201°–203°C. after crystallization from acetone.

b. From the reaction of 4.3 g. of 4-(m-chlorophenyl)-6,7,8,9-tetrahydro-1,3,6-trimethyl-9-(trifluoroacetyl)-1H-pyrazolo[3,4-b][1,5]diazocine, 5-oxide and 20 ml. of concentrated aqueous ammonia in 30 ml. of methanol, there is obtained 4-(m-chlorophenyl)-6,7,8,9-tetrahydro-1,3,6-trimethyl-1H-pyrazolo[3,4-b][1,5]diazocine, 5-oxide; m.p. 192°–193°C. after crystallization from acetoneether.

c. From the reaction of 7.5 g. of 4-(m-bromophenyl)-6,7,8,9-tetrahydro-1,3-dimethyl-9-(trifluoroacetyl)-1H-pyrazolo[3,4-b][1,5]diazocine, 5-oxide and 20 ml. of concentrated aqueous ammonia in 75 ml. of methanol, there is obtained 4-(m-bromophenyl)-6,7,8,9-tetrahydro-1,3-dimethyl-1H-pyrazolo[3,4-b][1,5]diazocine, 5-oxide; m.p. 214°–216°C. after crystallization from acetone-ether.

d. From the reaction of 7.4 g. of 4-(p-chlorophenyl)-6,7,8,9-tetrahydro-1,3-dimethyl-9-(trifluoroacetyl)-1H-pyrazolo[3,4-b][1,5]diazocine, 5-oxide and 20 ml. of concentrated aqueous ammonia in 75 ml. of methanol, there is obtained 4-(p-chlorophenyl)-6,7,8,9-tetrahydro-1,3-dimethyl-1H-pyrazolo[3,4-b][1,5]diazocine, 5-oxide; m.p. 225°–227°C. after crystallization from acetone.

STARTING MATERIALS

The various starting materials employed in the foregoing Examples and intermediates required for their preparation either are known materials or are novel substances which can be obtained by the methods described in the following:

A. 2-SUBSTITUTED-1,3-PROPANEDIAMINES 1. 2-Ethyl-1,3-propanediamine

To a solution of 46.5 g. of ethylmalononitrile (C.A. 65, 5481e) in 250 ml. of toluene is added 13 ml. of triethylamine and 13 g. of Raney cobalt and the mixture is shaken with hydrogen at 2000 lbs./in.$^2$ at 125°C. until hydrogen uptake ceases. The catalyst is removed by filtration and the filtrate distilled at reduced pressure. The material boiling up to 80°C. at 8 mm. is discarded and the residual 2-ethyl-1,3-propanediamine is used as such without further purification.

2. 2-Isopropyl-1,3-propanediamine

Obtained by the method of A(1) by the hydrogenation of 108 g. of isopropylmalononitrile (C.A. 49, 5295c) dissovled is 700 ml. of toluene, in the presence of 40 ml. of triethylamine and 40 g. of Raney cobalt; purified by distillation at reduced pressure; b.p. 90°–100°C./6–9 mm.

B. 4-AROYL-( and CYCLOHEXANOYL)-5-CHLOROPYRAZOLES 1. 4-Benzoyl-5-chloro-1-methyl-3-nitropyrazole a. To a stirred mixture of 28 g. of benzoyl chloride and 27 g. of anhydrous aluminum chloride in 200 ml. of 1,2-dichloroethane is added portionwise 11.3 g. of 3-amino-5-hydroxy-1-methylpyrazole [J. Am. Chem. Soc. 71, 986 (1949)]. The mixture is stirred and heated at reflux for 16 hours, then cooled and poured into excess dilute hydrochloric acid. The organic phase is separated and extracted with 300 ml. of 1N aqueous sodium hydroxide. The aqueous extract is acidified with concentrated hydrochloric acid and the resulting mixture extracted with dichloromethane. The dichloromethane extract is dried and evaporated at reduced pressure to give a residue of 3-benzamido-4-benzoyl-5-hydroxy-1-methylpyrazole; m.p. 215°C. after crystallization from acetonitrile.

b. A mixture of 19 g. of 3-benzamido-4-benzoyl-5-hydroxy-1-methylpyrazole and 100 g. of phosphorus oxychloride is stirred and heated at reflux for 16 hours, then cooled and added slowly with stirring to a mixture of 250 ml. of concentrated aqueous ammonia, 250 g. of ice and 300 ml. of dichloromethane. The organic phase is separated, washed with saturated aqueous sodium bicarbonate, dried and evaporated to give 3-benzamido-4-benzoyl-5-chloro-1-methylpyrazole; m.p. 179°–180°C. after crystallization from ethnol.

c. A mixture of 20 g. of 3-benzamido-4-benzoyl-5-chloro-1-methylpyrazole, 50 ml. of 48 percent hydrobromic acid and 80 ml. of glacial acetic acid is heated at reflux for 75 minutes. then evaporated at reduced pressure. The residue is dissolved in 250 ml. of dichloromethane and the solution is stirred with a large excess of cold dilute aqueous ammonia. The organic phase is separated, dried and evaporated at reduced pressure to give 3-amino-4-benzoyl-5-chloro-1-methylpyrazole; m.p. 107°–110°C. after crystallization from ether.

d. A solution of trifluoroperacetic acid is prepared by adding dropwise at 0°C. 5.4 ml. of 90 hydrogen peroxide to a stirred solution of 34 ml. of trifluoroacetic acid in 100 ml. of dichloromethane. The solution is allowed to warm to 20°C. and a solution of 6.5 g. of 3-amino-4-benzoyl-5-chloro-1-methylpyrazole in 40 ml. of dichloromethane is added dropwise with stirring. The solution is heated at reflux for 90 minutes, cooled, washed with water then with saturated aqueous sodium bicarbonate, dried and evaporated at reduced pressure to give a residue of 4-benzoyl-5-chloro-1-methyl-3-nitropyrazol; m.p. 95°–97°C. after crystallization from ethyl acetate-petroleum ether.

2. 5-Chloro-1-ethyl-3-methyl-4-($\alpha,\alpha,\alpha$-trifluoro-m-toluyl)pyrazole a. To a solution of 58.1 g. of 1-ethyl-3-methyl-5-pyrazolone (U.S. Pat. No. 3,660,425) and 75 ml. of triethylamine in 500 ml. of chloroform is added dropwise 96 g. of $\alpha,\alpha,\alpha$-trifluoro-m-toluyl fluoride. The mixture is stirred and heated at reflux for 16 hours, then washed twice with water and with dilute hydrochloric acid. The organic solution is extracted with excess 1N aqueous sodium hydroxide. The aqueous extract is acidified with concentrated hydrochloric acid and the resulting precipitate of 1-ethyl-5-hydroxy-3-methyl-4-($\alpha,\alpha,\alpha$-trifluoro-m-toluyl)pyrazole is collected by filtration, washed with water and dried; m.p. 100°–102°C. after crystallization from ether.

b. To 68 g. of phenylphosphonic dichloride is added portionwise with stirring 50 g. of 1-ethyl-5-hydroxy-3-methyl-4-($\alpha,\alpha,\alpha$-trifluoro-m-toluyl)pyrazole. The mixture is heated slowly to 140°C., maintained at this temperature for 2 hours, then cooled. The cooled solution is added slowly to 300 ml. of water and the mixture is basified by the slow addition of 80 ml. of concentrated aqueous ammonia with cooling. The resulting precipitate of 5-chloro-1-ethyl-3-methyl-4-($\alpha,\alpha,\alpha$-trifluoro-m-toluyl)pyrazole is collected by filtration, washed with water and dried; m.p. 55°–57°C. after crystallization from ether-petroleum ether.

3. 5-Chloro-3-ethyl-1-methyl-4-($\alpha,\alpha,\alpha$-trifluoro-m-toluyl)pyrazole a. 3-Ethyl-5-hydroxy-1-methyl-4-($\alpha,\alpha,\alpha$-trifluoro-m-toluyl)pyrazole is obtained by the method of 2a above from the reaction of 25 g. of 3-ethyl-1-methyl-5-pyrazolone prepared by reacting methyl pentinoate and methyl hydrazine, [J. Org. Chem. 36, 2546 (1971)], 38 g. of $\alpha,\alpha,\alpha$-trifluoro-m-toluyl fluoride and 30 ml. of triethylamine in 150 ml. of chloroform; m.p. 184°–187°C. after crystallization from acetonitrile.

b. 5-Chloro-3-ethyl-1-methyl-4-($\alpha,\alpha,\alpha$-trifluoro-m-toluyl)pyrazole is obtained by the method of 2b above from the reaction of 40 g. of 3-ethyl-5-hydroxy-1-methyl-4-($\alpha,\alpha,\alpha$-trifluoro-m-toluyl)pyrazole and 60 g. of phenylphosphonic dichloride; m.p. 53°–55°C. after crystallization from hexane.

4. 4-(m-Bromobenzoyl)-5-chloro-1,3-dimethylpyrazole

A mixture of 20 g. of 5-chloro-1,3-dimethylpyrazole (U.S. Pat. No. 3,660,425), 33 g. of m-bromobenzoyl chloride and 20 g. of anhydrous aluminum chloride in 200 ml. of s-tetrachloroethane is stirred and heated at reflux for 18 hours, cooled and poured into a mixture of ice water and concentrated hydrochloric acid. The organic phase is separated, washed with 4N aqueous sodium hydroxide, then with water, dried and evaporated to give a residue of 4-(m-bromobenzoyl)-5-chloro-1,3-dimethylpyrazole; m.p. 84°–85°C. after crystallization from ethyl acetate-petroleum ether.

5. 4-(m-Bromobenzoyl)-5-chloro-3-ethyl-1-methylpyrazole

Obtained by the method of B(4) above from the reaction of 21.5 g. of 5-chloro-3-ethyl-1-methylpyrazole prepared by reacting 3-ethyl-1-methyl-5-pyrazolone and phosphoryl chloride, [J. Org. Chem, 36, 2546 (1971)] with 33 g. of m-bromobenzoyl chloride in the presence of 20 g. of anhydrous aluminum chloride in 150 ml. of s-tetrachloroethane; the product is purified by distillation (b.p. 160°–170°C./0.3 mm.) and then crystallized from petroleum ether, m.p. 50°C.

6. 5-Chloro-4-(p-chlorobenzoyl)-1-ethyl-3-methylpyrazole a. To a stirred mixture of 49 g. of 1-ethyl-3-methyl-5-pyrazolone (U.S. Pat. No. 3,660,425) and 60 g. of calcium hydroxide is 300 ml. of dioxane is added dropwise 70 g. of p-chlorobenzoyl chloride. The mixture is stirred and heated at reflux for 1 hour, then poured into a solution of 120 ml. of concentrated hydrochloric acid in 1 liter of water. The resulting precipitate of 4-(p-chlorobenzoyl)-1-ethyl-5-hydroxy-3-methylpyrazole is collected by filtration, washed with water and dried; m.p. 150°–152°C. after crystallization from acetonitrile.

b. A mixture of 60 g. of 4-(p-chlorobenzoyl)-1-ethyl-5-hydroxy-3-methylpyrazole and 70 g. of phosphorus oxychloride is heated at reflux for 4 hours, cooled and poured slowly with stirring into a mixture of 200 ml. of concentrated aqueous ammonia, 200 g. of ice and 400 ml. of ether. The mixture is stirred an additional 30 minutes and the organic phase is separated, washed with water, dried and evaporated to give a residue of 5-chloro-4-(p-chlorobenzoyl)-1-ethyl-3-methylpyrazole which is purified by distillation at reduced pressure; b.p. 170°C./0.8 mm.

7. 5-Chloro-4-(p-chlorobenzoyl)-3-ethyl-1-methylpyrazole

Obtained by the method of B(4) from the reaction of 30 g. of 5-chloro-3-ethyl-1-methylpyrazole [J. Org. Chem. 36, 2546 (1971)] with 35 g. of p-chlorobenzoyl chloride in the presence of 27 g. of aluminum chloride in 200 ml. of s-tetrachloroethane; the product is purified by distillation; b.p. 170°–175°C./0.75 mm.

8. 5-Chloro-4-(3,4-dichlorobenzoyl)-1,3-dimethylpyrazole

Obtained by the method of B(4) from the reaction of 20 g. of 5-chloro-1,3-dimethylpyrazole (U.S. Pat. No. 3,660,425) with 31 g. of 3,4-dichlorobenzoyl chloride in the presence of 20 g. of aluminum chloride in 150 ml. of s-tetrachloroethane; the oily product is purified by dissolving it in acetone, filtering the solution through neutral activated alumina, and evaporating the filtrate.

9. 5-Chloro-1,3-dimethyl-4-picolinoylpyrazole

To a stirred solution of 63 g. of 4-bromo-5-chloro-1,3-dimethylpyrazole [J. Org. Chem. 36, 2546 (1971)] in 1 liter of ether, cooled to −5° to −10°C., is added dropwise 205 ml. of a 15 percent solution of butyl lithium in heptane. The resulting mixture is stirred for 15 minutes at −5°C., then treated dropwise with a solution of 31.2 g. of 2-cyanopyridine in 65 ml. of ether while allowing the temperature to rise to 20°–25°C. The mixture is stirred and heated at reflux for 4 hours, then stirred at room temperature (20°–25°C.) for 16 hours and treated with 500 ml. of water. The organic phase is separated and stirred with a solution of 85 ml. of concentrated hydrochloric acid in 100 ml. of water. The aqueous phase is separated, basified with aqueous sodium hydroxide and extracted with ether. The ether extract is washed with water, dried and evaporated to give 5-chloro-1,3-dimethyl-4-picolinoylpyrazole; m.p. 82°–83°C. after crystallization from ether.

10. 5-Chloro-4-(cyclohexanecarbonyl)-1,3-dimethylpyrazole a. To a stirred solution of 63 g. of 4-bromo-5-chloro-1,3-dimethylpyrazole [J. Org. Chem. 36, 2546 (1971) in 700 ml. of ether cooled to −5°C. is added dropwise 205 ml. of a 15 percent solution of butyl lithium in heptane. The resulting mixture is stirred for 15 minutes at −5°C., then treated dropwise with a solution of 35 g. of cyclohexanecarboxaldehyde in 100 ml. of ether while allowing the temperature to rise to 20°–25°C. The mixture is stirred and heated at reflux for 2 hours, cooled and treated with 500 ml. of water. The organic phase is separated, washed with water, dried and evaporated to give 5-chloro-$\alpha$-cyclohexyl-1,3-dimethylpyrazole-4-methanol; m.p. 85°–86°C. after crystallization from 2,2,4-trimethylpentane.

b. To a cold (5°C.) solution of 48.5 g. of 5-chloro-$\alpha$-cyclohexyl-1,3-dimethylpyrazole-4-methanol in 500 ml. of acetone is added with stirring 52 ml. of Jones reagent (prepared by dissolving 26.72g. of chromic trioxide in 23 ml. of concentrated sulfuric acid and diluting with water to a volume of 100 ml.). The mixture is concentrated to about 100 ml. and diluted with ether. The organic phase is separated, washed with saturated aqueous sodium bicarbonate, with water, dried and evaporated to give 5-chloro-4-(cyclohexanecarbonyl)-1,3-dimethylpyrazole; m.p. 79°–80°C.

11. 5-Chloro-1-ethyl-3-methyl-4-(2-thenoyl)pyrazole a. 5-chloro-1-ethyl-3methyl-$\alpha$-(2-thienyl)pyrazole-4-methanol is obtained by the method of B(10a) from the reaction of 23.6 g. of 4-bromo-5-chloro-1-ethyl-3-methylpyrazole [J. Org. Chem. 36, 2546 (1971)] in 200 ml. of ether and 60 ml. of a 1.67M solution of butyl lithium in heptane, with a solution of 12.3 g. of 2-thiophenealdehyde in 50 ml. of ether; the product is obtained as an oil, suitable for use without further purification.

b. 5-Chloro-1-ethyl-3-methyl-4-(2-thenoyl)pyrazole is obtained by the method of B(10b) by the reaction of 25.6 g. of 5-chloro-1-ethyl-3-methyl-$\alpha$(2-thienyl)pyrazole-4-methanol in 200 ml. of acetone with 25 ml. of Jones reagent; the product is obtained as an oil, suitable for use without further purification.

12. 5-Chloro-1,3-dimethyl-4-($\alpha,\alpha,\alpha$-trifluoro-p-toluyl)pyrazole

Obtained by the method of B(9) from the reaction of 52.6 g. of 4-bromo-5-chloro-1,3-dimethylpyrazole [J. Org. Chem. 36, 2546 (1971)] in 1 liter of ether and 150 ml. of a 1.8M solution of butyl lithium in heptane, with a solution of 43 g. of $\alpha,\alpha,\alpha$-trifluoro-p-tolunitrile in 100 ml. of ether; m.p. 79°–80°C. after crystallization from petroleum ether.

What is claimed is:

1. A member of the class consisting of pyrazolodiazocine compounds having the formula

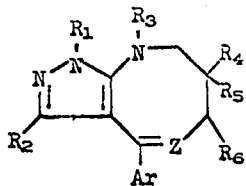

and pharmaceutically-acceptable acid-addition salts thereof; where $R_1$ is methyl or ethyl, $R_2$ is nitro, methyl or ethyl, $R_3$ represents a member of the class consisting of hydrogen, methyl, ethyl, nitro, trifluoroacetyl and —$(CH_2)_nNR_7R_8$, $R_4$ and $R_5$ are hydrogen or lower alkyl, $R_6$ is hydrogen, or methyl, Z is N or N → O, Ar represents a member of the class consisting of phenyl, halophenyl, tolyl, methoxyphenyl, $\alpha,\alpha,\alpha$-trifluorotolyl, 3,4-dichlorophenyl, cyclohexyl, 2-thienyl and 2-pyridyl, $n$ is 2 or 3, and —$NR_7R_8$ represents a member of the class consisting of dimethylamino, diethylamino and 1-pyrrolidinyl, Z representing N when $R_3$ represents —$(CH_2)_nNR_7R_8$.

2. A compound according to claim 1 which is 6,7,8,9-tetrahydro-1,3-dimethyl-4-($\alpha,\alpha,\alpha$-trifluoro-m-tolyl)-1H-pyrazolo[3,4-b][1,5]diazocine.

3. A compound according to claim 1 which is 6,7,8,9-tetrahydro-1,3-dimethyl-4-($\alpha,\alpha,\alpha$-trifluoro-m-tolyl)-1H-pyrazolo[3,4-b][1,5]diazocine, hydrochloride.

4. A compound according to claim 1 which is 6,7,8,9-tetrahydro-1,3,9-trimethyl-4-phenyl-1H-pyrazolo[3,4-b][1,5]diazocine.

5. A compound according to claim 1 which is 6,7,8,9-tetrahydro-1,3,9-trimethyl-4-phenyl-1H-pyrazolo[3,4-b][1,5]-diazocine, dihydrochloride.

6. A compound according to claim 1 which is 4-(m-chlorophenyl)-6,7,8,9-tetrahydro-1,3,6-trimethyl-1H-pyrazolo[3,4-b][1,5]diazocine.

7. A compound according to claim 1 which is 4-(p-chlorophenyl)-6,7,8,9-tetrahydro-1,3-dimethyl-1H-pyrazolo[3,4-b][1,5]diazocine.

8. A compound according to claim 1 which is 6,7,8,9-tetrahydro-1,3-dimethyl-4-(2-thienyl)-1H-pyrazolo[3,4-b][1,5]-diazocine.

9. A compound according to claim 1 which is 9-[3-(dimethylamino)propyl]-6,7,8,9-tetrahydro-1,3-dimethyl-4-($\alpha,\alpha,\alpha$-trifluoro-m-tolyl)-1H-pyrazolo[3,4b][1,5]diazocine, trihydrochloride.

* * * * *

UNITED STATES PATENT OFFICE
CERTIFICATE OF CORRECTION

PATENT NO. : 3,873,565
DATED : March 25, 1975
INVENTOR(S) : HORACE A. DeWALD and YVON J. L'ITALIEN It is certified that error appears in the above-identified patent and that said Letters Patent are hereby corrected as shown below:

Column 3, line 62, delete "$R_3'''$" and insert:
--$R_3'''$--.

Column 3, line 63, correct the spelling of "ethyl".

Column 8, line 26, delete "etherpetroleum" and insert:
--ether-petroleum--.

Column 9, line 6, delete "chloroformether" and insert:
--chloroform-ether--.

Column 11, line 24, delete "the" and insert:
--The--.

Column 12, line 14, delete "tetrahydrol,3,9-" and insert:
--tetrahydro-1,3,9- --.

Column 13, line 67, delete "($\alpha,\alpha$  $\alpha$-trifluoro-" and insert:
--($\alpha,\alpha,\alpha$-trifluoro- --.

Column 14, line 13, after "sulfate" insert:
--salt--.

Column 14, line 56, delete "etherpetroleum" and insert:
--ether-petroleum--.

Column 14, line 63, delete "diethyl" and insert:
--dimethyl--.

UNITED STATES PATENT OFFICE
CERTIFICATE OF CORRECTION

Patent No. 3,873,565     Dated March 25, 1975

Inventor(s) HORACE A. DeWALD and YVON J. L'ITALIEN

It is certified that error appears in the above-identified patent and that said Letters Patent are hereby corrected as shown below:

Column 15, line 28, delete "1,3-dichloroethane" and insert:
--1,2-dichloroethane--.

Column 16, line 56, delete the letter "a" before "(α,α,α-".

Column 17, line 11, delete acetoneether" and insert:
--acetone-ether--.

Column 17, line 51, correct the spelling of "dissolved" and change "is" to read:
--in--.

Column 18, line 29, after "90" insert:
--percent--.

Column 18, line 39, correct the spelling of "nitropyrazole".

Column 19, line 18, insert the numeral "4." before "A mixture" so that it reads:
--4. A mixture--.

Column 19, line 45, change "hydroxide is" to read:
--hydroxide in--.

Column 20, line 64, delete "3methyl" and insert:
--3-methyl--.

Signed and sealed this 15th day of July 1975.

(SEAL)
Attest:

RUTH C. MASON
Attesting Officer

C. MARSHALL DANN
Commissioner of Patents
and Trademarks